US012446854B2

(12) United States Patent
Dhatt et al.

(10) Patent No.: US 12,446,854 B2
(45) Date of Patent: Oct. 21, 2025

(54) ULTRASOUND PROBE GUIDANCE

(71) Applicant: FUJIFILM SONOSITE, INC., Bothell, WA (US)

(72) Inventors: Davin Dhatt, Woodinville, WA (US); Thomas Endres, Sagle, ID (US)

(73) Assignee: FUJIFILM SONOSITE, INC., Bothell, WA (US)

( * ) Notice: Subject to any disclaimer, the term of this patent is extended or adjusted under 35 U.S.C. 154(b) by 0 days.

(21) Appl. No.: 17/393,022

(22) Filed: Aug. 3, 2021

(65) Prior Publication Data

US 2023/0043371 A1 Feb. 9, 2023

(51) Int. Cl.
*A61B 8/00* (2006.01)

(52) U.S. Cl.
CPC .......... *A61B 8/4254* (2013.01); *A61B 8/4444* (2013.01); *A61B 8/461* (2013.01)

(58) Field of Classification Search
CPC ...... A61B 8/4254; A61B 8/4444; A61B 8/461
See application file for complete search history.

(56) References Cited

U.S. PATENT DOCUMENTS

| | | | | |
|---|---|---|---|---|
| 7,857,773 | B2 * | 12/2010 | Desilets | A61N 7/02 601/3 |
| 2009/0024030 | A1 * | 1/2009 | Lachaine | A61B 8/14 600/437 |
| 2014/0163377 | A1 * | 6/2014 | Kang | A61B 8/0875 600/447 |
| 2015/0005631 | A1 * | 1/2015 | Jeong | A61B 8/485 600/438 |
| 2016/0317122 | A1 * | 11/2016 | dos Santos Mendonca | G01C 21/1652 |
| 2016/0317127 | A1 * | 11/2016 | dos Santos Mendonca | A61B 8/5276 |
| 2020/0281562 | A1 * | 9/2020 | Haase | A61B 6/12 |
| 2021/0169579 | A1 * | 6/2021 | Laviola | A61B 8/4254 |
| 2022/0054108 | A1 * | 2/2022 | In 'T Groen | A61B 8/429 |

(Continued)

FOREIGN PATENT DOCUMENTS

| | | | | |
|---|---|---|---|---|
| CN | 105852906 | B | * 6/2019 | ............ A61B 8/06 |
| KR | 101551740 | B1 | * 9/2015 | ............ A61B 8/00 |

(Continued)

OTHER PUBLICATIONS

KR101551740B1 (Korea Res Inst of Standards). Sep. 11, 2015, Translation retrieved on Jun. 29, 2022. (Year: 2015).*

(Continued)

*Primary Examiner* — Keith M Raymond
*Assistant Examiner* — Andrew W Begeman
(74) *Attorney, Agent, or Firm* — Colby Nipper PLLC

(57) ABSTRACT

Certain embodiments describe a system, method, and apparatus for ultrasound imaging. For example, the system can include a probe comprising a transducer configured to transmit or receive ultrasound waves. The system can also include a display communicatively coupled to the probe and one or more processors. The one or more processors cause the ultrasound system to detect, using the probe, one or more markings of a membrane located on a skin of a patient. The ultrasound system is also caused to determine position of the probe based on the one or more markings. In addition, the ultrasound system is caused to render on the display an indication of the position of the probe.

41 Claims, 7 Drawing Sheets

(56) References Cited

U.S. PATENT DOCUMENTS

2022/0225963 A1 * 7/2022 Sutton .................... A61B 8/488

FOREIGN PATENT DOCUMENTS

| KR | 20180070878 A | * | 6/2018 | ............... A61B 8/00 |
| WO | WO-2019179344 A1 | * | 9/2019 | ........... A61B 8/4254 |

OTHER PUBLICATIONS

KR20180070878A (Siemens Medical Solutions USA Inc), Jun. 27, 2018, Translation retrieved on Jun. 29, 2022. (Year: 2018).*
WO2019179344A1 (Univ Shenzhen), Sep. 26, 2019, Translation retrieved on Jun. 29, 2022. (Year: 2019).*
CN105852906A (Qsida Suzhoi Co Ltd). Translated by Espacenet. Jun. 28, 2019. [retrieved on Mar. 18, 2025] (Year: 2019).*

* cited by examiner

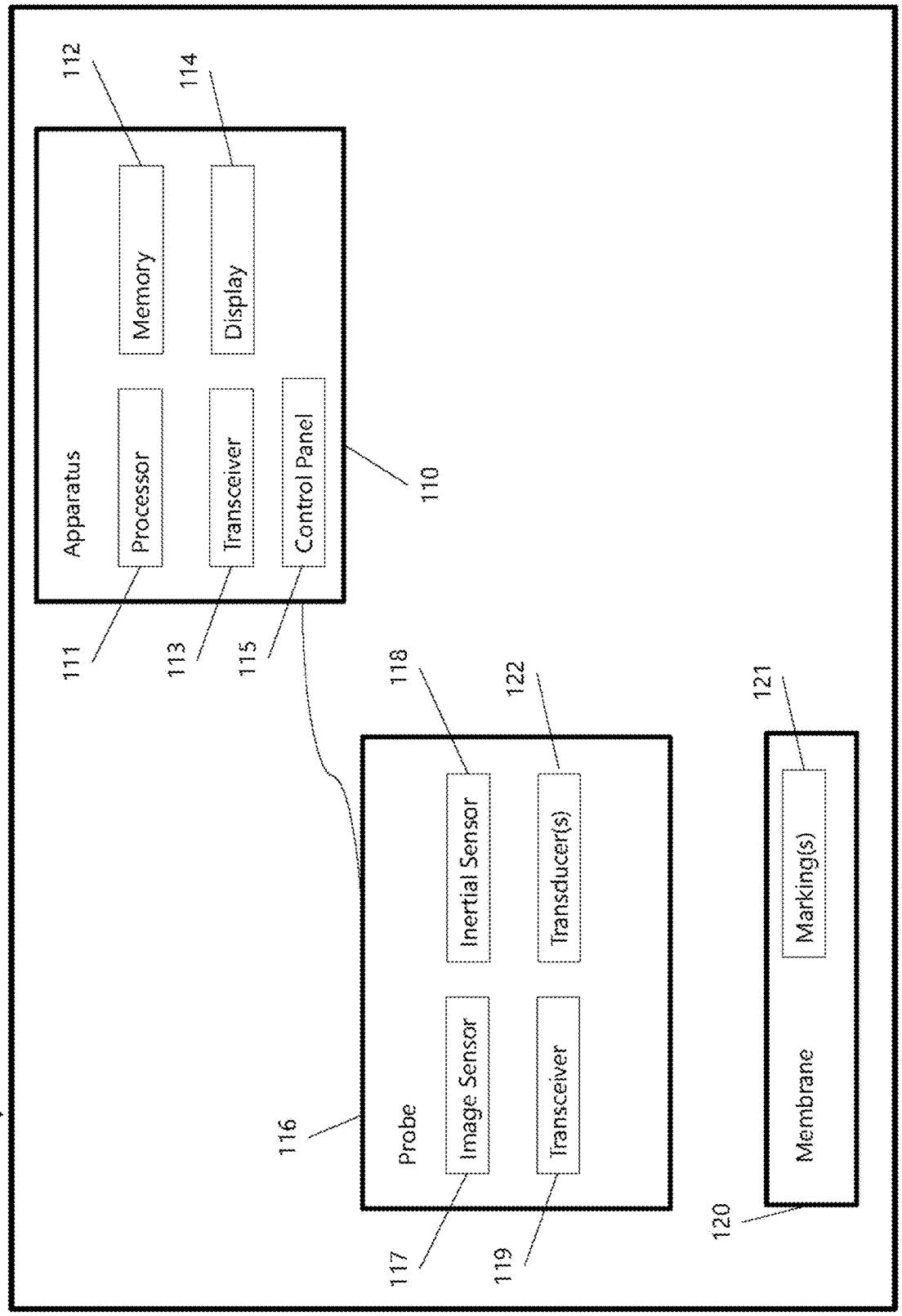

ULTRASOUND PROBE GUIDANCE

FIELD

The present disclosure relates generally to ultrasound probe guidance to be used in connection with imaging a patient.

BACKGROUND

Ultrasound imaging systems are complex, versatile medical imaging systems that rely on high frequency sound waves and resulting echoes. In particular, ultrasound imaging systems include a probe, having a transducer that can transmit sound waves into a patient's body, and sense returning sound waves reflected by the patient's body. The ultrasound imaging system uses the returning sound waves to produce a two-dimensional or three-dimensional image of the patient's body. To properly operate an ultrasound imaging system, and the many functions it provides, medical or imaging professionals often operate the ultrasound imaging system.

Even for medical or imaging professionals, there is a learning curve associated with properly imaging a patient using an ultrasound imaging system. Improper operation of the ultrasound imaging system can lead to sub-optimal patient care, and potentially result in misdiagnoses. Accordingly, there is a need to reduce the learning curve associated with use of ultrasound imaging systems. Reducing the learning curve can not only improve the experience for medical or imaging professionals, but also allow less experienced users to utilize the ultrasound imaging system.

SUMMARY

The disclosed subject matter described below provides for non-limiting examples of an improved ultrasound imaging navigation system, apparatus, and method. For example, an ultrasound system can include a probe comprising a transducer configured to transmit or receive ultrasound waves, a display communicatively coupled to the probe, and one or more processors. The ultrasound system is caused to detect, using the probe, one or more markings of a membrane located on a skin of a patient. The ultrasound system is also caused to determine a position of the probe based on the one or more markings. Further, the ultrasound system is caused to render on the display an indication related to the estimated position of the probe. The indication, for example, can include guidance information. The indication can include instructions to navigate the probe on the skin of the patient.

Additionally or alternatively, the ultrasound imaging navigation system can include a camera communicatively coupled to the probe. The one or more markings of the membrane can be detected using at least one of the camera or the transducer. The camera and the transducer can be located in a unitary housing. In certain non-limiting embodiments, the probe includes the camera and the transducer in a unitary housing. In an example, the probe includes a handle containing the camera. The one or more markings can form a printed pattern on the membrane or can be embedded in the membrane. The one or more markings can be a wire, bubble, or any other object detected by an ultrasound imaging navigation system. An outside surface of the membrane can include the one or more markings. Additionally or alternatively, the membrane can contain the one or more markings. The membrane, for example, can be at least one of a thin adhesive plastic or a pad including a layer of gel. Additionally or alternatively, the ultrasound system can include an inertial sensor communicatively coupled to the probe, with the inertial sensor producing position data related to the position of the probe. The one or more processors can generate, based on the position data, a confirmation that an error of the position is less than a threshold, such as a distance threshold, angular threshold, or combinations thereof.

Additionally or alternatively, an ultrasound system can include a probe having a transducer configured to transmit or receive ultrasound waves, a camera communicatively coupled to the probe, a display communicatively coupled to the probe, and one or more processors. The one or more processors can cause the ultrasound system to detect one or more markings of a membrane located on a skin of a patient using one or more of the transducer and the camera. The ultrasound system can be caused to determine a position of the probe based on the one or more markings. The position can be estimated using a simultaneous localization and mapping (SLAM). Additionally or alternatively, the one or more processors cause the ultrasound system to render on the display an indication related to the position of the probe. The ultrasound system can include an inertial sensor communicatively coupled to the probe. The ultrasound system can be caused to determine the position of the transducer based at least in part on data produced by the inertial sensor.

Another example can include a method for ultrasound imaging. The method includes detecting, using an ultrasound probe, one or more markings of a membrane located on a skin of a patient. The method also includes determining a position of the ultrasound probe based on the one or more markings. In addition, the method includes rendering on a display an indication related to the position of the ultrasound probe.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 1 is a diagram illustrating exemplary components of a system according to some examples of the disclosed subject matter.

DETAILED DESCRIPTION

Figure 2A:
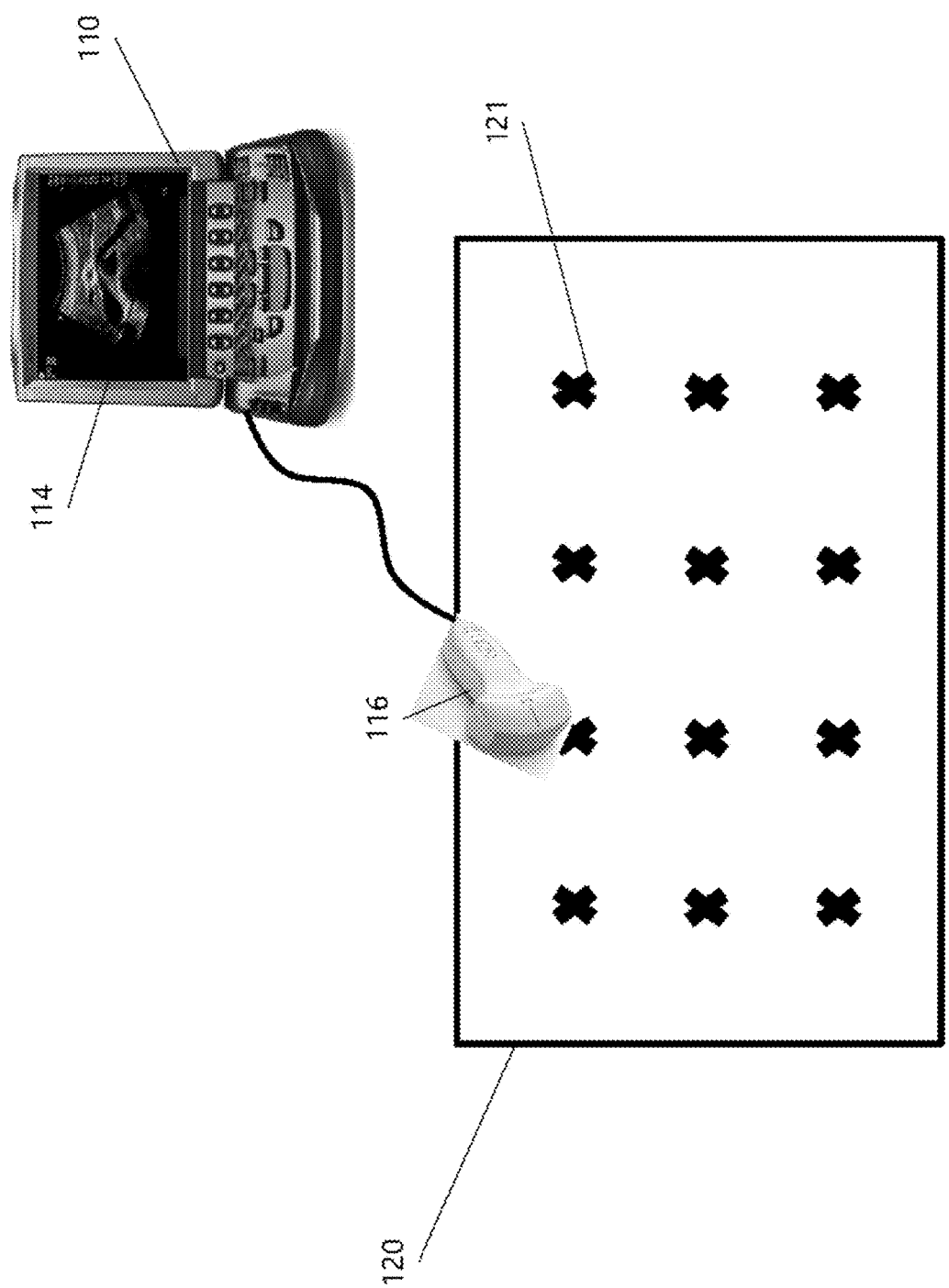
FIGS. 2A-D are diagrams illustrating exemplary components of a system including various markings, according to some examples of the disclosed subject matter.

Reference will now be made in detail to the various exemplary embodiments of the disclosed subject matter, which embodiments are illustrated in the accompanying drawings. The structure and corresponding method of operation of the disclosed subject matter will be described in conjunction with the detailed description of the system. The examples and embodiments described below are merely exemplary, and should not be taken in any way as limiting the scope of the disclosed subject matter.

Certain non-limiting embodiments can determine (e.g., estimate and/or track) the position of an ultrasound transducer during operation. For example, in some non-limiting embodiments the estimating or tracking of the position of the ultrasound probe utilizes a membrane located on the body of a patient. The membrane can include one or more markings that can be detected by the probe, or any other component in coupled communication with the probe. In some non-limiting embodiments, the markings can be printed or embedded in a membrane or in a gel. Additionally or alternatively, the marking can be a wire, bubble, or any other object that can be detected by an ultrasound probe. Using the one or more markings, the ultrasound imaging system can estimate and/or track the position of the ultrasound probe. Based on the determined position, the ultrasound imaging system can provide an indication to a user of the ultrasound imaging system. The indication can be related to the position of the transducer relative to the body of the patient. In some non-limiting embodiments, the indication can provide guidance to the user related to the position of the transducer. The guidance, for example, can instruct the user how to navigate or position the transducer to image one or more particular body parts.

FIG. 1 is a diagram illustrating exemplary components of a probe guidance system 100 according to some examples of the disclosed subject matter. The components, for example, can include an ultrasound system, including apparatus 110 and a probe 116, as well as a membrane 120. In certain non-limiting embodiments, probe 116 can include one or more transducers 122 used to transmit and/or receive ultrasound waves to and from the body of the patient being examined. The one or more transducers 122 can be ordered as a one dimensional or a multi-dimensional (e.g., a 1.5 or two dimensional) array. In particular, FIG. 1 illustrates an apparatus 110, such as a computer, mobile device, user equipment, server, medical imaging device, photoacoustic imaging device, ultrasound imaging system or device, or any other apparatus or device that includes a processor 111, memory 112, transceiver 113, display 114, and control panel 115. The display 114 can provide a graphical user interface through which a user can communicate with the apparatus 110. In certain non-limiting embodiments, the system shown in FIG. 1 can include an ultrasound imaging system, for example, a portable point-of-care ultrasound system, which can be hand held, portable, or cart-based. It should be understood that each feature or step shown in FIGS. 1-4, and any combination thereof, can be implemented by an apparatus or an ultrasound imaging system, using various hardware, software, firmware, one or more processors or circuitry, or combinations thereof, in connection with various different embodiments of the disclosed subject matter.

In certain non-limiting embodiments, the apparatus 110 includes at least one processor 111. Processor 111 can also be a control unit in some non-limiting embodiments. At least one memory is provided in apparatus 110, indicated as memory 112. Memory 112 can include computer-readable storage media that can store computer program instructions or computer code, which can be executed by processor 111. The system can also include networked components communicating over a network (e.g., a local network or a wide area network). The components of the system in FIG. 1, including apparatus 110, can communicate through any wireless and/or wired communication protocols, or by any other coupling that allows communication of data from one system component to another. While FIG. 1 illustrates apparatus 110 being connected to probe 116 via a wire, in other non-limiting embodiments the connection can be wireless and utilize a known wireless communication protocol, such as a Bluetooth connection, a ZigBee connection, a radio frequency (RF) connection (e.g., a Wi-Fi communication link), a radio frequency identification (RFID) connection, an infrared connection, or combinations thereof.

One or more transceivers can be provided in apparatus 110 and/or probe 116. For example, transceiver 113 can receive signals from probe 116, and send signals to probe 116. In some non-limiting embodiments, transceiver 119 and transceiver 113 can communicate with each other, or with any other apparatus, via wired or wireless communication. The transmitted information can be saved in memory 112, or in any other memory or database external to apparatus 110 or probe 116. In an example, probe 116 includes controls, such as buttons, that can be activated by a user to adjust an imaging setting used by apparatus 110 and/or probe 116. For instance, a user can set a gain value via probe 116, and transceiver 119 can communicate the gain value to transceiver 113 of apparatus 110, which can then generate an image for display 114 based on the gain value. Additionally or alternatively, one or more transceivers 113 of apparatus 110 can communicate with a server or a cloud-based server.

In certain-non limiting embodiments, probe 116 can transmit sound waves of various frequencies and receive echo signals based on the transmitted sound waves. Probe 116 can include a transducer 122, which can be a single element transducer or a multi-element transducer that can sweep over a range of beam angles. The sound waves, for example, can range from a low bandwidth frequency of 3 Megahertz (MHz) to as high a frequency of 71 MHz. Other non-limiting embodiments can use any other soundwave frequency. Higher frequencies can allow for the imaging of superficial structures, while lower frequencies can allow for the deeper tissue imaging with each typically providing different resolutions. In one example, transducer 122 of probe 116 includes a first array used for low frequencies (e.g., below 20 MHz), and a second array used for high frequencies (e.g., greater than or equal to 20 MHz). In certain non-limiting embodiments probe 116 can include a beamformer that electronically adjusts the beam angle of the transducer 122.

The ultrasound imaging system can also include any other component not shown in FIG. 1, such as an analog front-end that includes, for example, a low noise amplifier (LNA), a voltage controlled attenuator (VCAT), a voltage controlled amplifier, an analog to digital converter, and/or a beamformer receiver. Once the analog sound signal is received by the probe, it can be amplified on the front end of the ultrasound imaging system and converted into a digital format using analog to digital converters. Once converted into digital form, the signal can be transmitted from probe 116 to apparatus 110.

Apparatus 110 can include or be connected to display 114, which can display the received digital information. For example, apparatus 110 can include a mobile device or user equipment that includes a touch-screen display or any other type of display. In certain non-limiting embodiments, display 114 can be located in a separate apparatus or machine from apparatus 110. Additionally or alternatively, the display 114 can include a projector capable of projecting an image onto a display, screen, or monitor, or active eyeglasses or headset that can be worn by the operator of the ultrasound imaging system to view the displayed data. Display 114 can be communicatively coupled to probe 116.

As described above, apparatus 110 can include a medical imaging device, such as an ultrasound machine or device, configured to carry out the embodiments described herein, such as the procedures described in relation to FIGS. 2A-4. Apparatus 110 can include at least one memory 112 including computer program code that, when executed by the at least one processor 111, causes the apparatus 110 to perform any or all of the steps, processes, or features described herein. Processor 111, for example, can be embodied by any computational or data processing device, such as a central processing unit (CPU), digital signal processor (DSP), application specific integrated circuit (ASIC), programmable logic devices (PLDs), field programmable gate arrays (FPGAs), input/output (I/O) circuitry, digitally enhanced circuits, or comparable device, or any combination thereof. The processors can be implemented as a single controller, or a plurality of controllers or processors. For example, processor 111 can be a single processor or one or more processors. Probe 116 can similarly include a single processor or one or more processors.

Apparatus 110 can also include a control panel 115, which can provide tactile gain control, for example. Control panel 115 can include a user interface, a touchpad, or a touchscreen used to adjust the near, middle, and far gain control. Control panel 115, can alternatively or in addition to, include other controls for adjusting or changing various settings of the ultrasound imaging system.

Memory 112 can include any suitable storage device, such as a non-transitory computer-readable medium, a hard disk drive (HDD), random access memory (RAM), flash memory, or other suitable memory. Memory 112 can include a single memory or a plurality of memories. The memories can be combined on a single integrated circuit with a processor, or can be separate therefrom. In certain non-limiting embodiments, computer program instructions can be stored in memory 112 and processed by processor 111. The computer program can include any suitable form of computer program code, for example, a compiled or interpreted computer program written in any suitable programming language. For example, in certain non-limiting embodiments, a non-transitory computer-readable medium can be encoded with computer instructions or one or more computer programs (such as added or updated software routine, applet or macro) that, when executed in hardware, can perform a process such as one of the steps, processes, or features described herein. For any firmware or software used by the ultrasound imaging system, the implementation can include one or more modules or a unit of at least one chip set. Computer programs can be coded by a programming language, which can be a high-level programming language, such as objective-C, C, C++, C#, Java, etc., or a low-level programming language, such as a machine language, or assembler. Alternatively, certain steps, processes, or features can be performed entirely in hardware.

Probe 116 includes an image sensor 117 and inertial sensor 118. Additionally or alternatively, probe 116 can include any other type of sensor, such as a magnetic sensor or a radio frequency sensor. For example, image sensor 117 can include, or be included inside, a digital camera. Image sensor 117 can include any suitable sensor, such as a charged couple device (CCD) sensor or a complementary metal-oxide semiconductor (CMOS) sensor. In certain non-limiting embodiments, inertial sensor 118 can be an inertial measurement unit (IMU) that includes one or more of an accelerometer, a gyroscope, magnetometer, and a compass. Inertial sensor 118, for example, can be a Micro Electro Mechanical Systems (MEMS) sensor. In some non-limiting embodiments, one or more of the probe 116, image sensor 117, or inertial sensor 118 can be kept in a unitary housing. The unitary housing can be a monolithic container or an enclosure comprised of multiple pieces that connect to form the unitary housing. That unitary housing, for example, can include imaging sensor 117, inertial sensor 118, and/or transceiver 119.

Image sensor 117, for example a camera, can be placed near the end of the probe 116 near the piezoelectric element, array of sensors, or acoustic lens. In yet another example, a camera of image sensor 117 can be placed on a handle of probe 116. A camera of image sensor 117 can be installed or inserted at an angle relative to the unitary housing that allows the camera to capture images of the membrane placed on the patient. In certain non-limiting embodiments, a camera of image sensor 117 can be placed within the handle itself or can be attached to an outside surface of the handle.

Being placed on the handle of probe 116 can provide a camera of image sensor 117 with a point of view that limits possible obstructions to the camera. The obstructions, for example, can include the user's hand, gel employed by the user during the ultrasound imaging, additional equipment communicatively connected or coupled to the ultrasound imaging system, or any other obstruction that can limit the view of the camera.

In certain non-limiting embodiments, a membrane 120 can be placed on or attached to the body of a patient. Membrane 120, for example, can be a square, rectangle, circle, oval, or take on any other shape appropriate to fit the body of a patient. Membrane 120 can be made in a single size to fit all patients or can be produced in various sizes to fit patients of differing sizes. In some non-limiting embodiments, the shape of membrane 120 can be dependent on the placement of the membrane on the patient's body and/or the body part the user intends to image. For example, membrane 120 can have a square shape for abdominal imaging, and/or a rectangular shape for scanning an arm (e.g., for peripheral intravenous insertion) or a leg (e.g., for deep vein thrombosis). Additionally or alternatively, a complex shape with an irregular surface can be used for a suprasternal view or an elbow (e.g., for looking at soft tissue disease). The complex shape can help to avoid folds. In one example, the membrane 120 is formed in the shape of a body part, such as a bladder shape for use with imaging a bladder. Hence, the shape of membrane 120 can indicate to a user a proper orientation for installing membrane 120 on a patient, by aligning membrane 120 with a body part of the patient.

Membrane 120 can be made of any material that can be placed or attached on a body of a patient. The material can be selected to minimize and/or reduce disturbance of ultrasound imaging, and/or to permit acceptable ultrasound imaging therethrough. For example, membrane 120 can be made of one or more layers of plastic, such as polyurethane. In some non-limiting embodiments membrane 120 can be a film of plastic. The one or more layers of plastic can be coated with an adhesive, such as acrylic, to allow the membrane to attach to the body of the patient. In other examples, membrane 120 can simply be placed on the body of the patient without use of an adhesive.

In some non-limiting embodiments, membrane 120 can be a pad and can include one or more layers of gel, herein referred to as a gel pad. The gel, for example, can be propylene glycol, silicone, or any other material that can enhance the quality of the ultrasound image. For instance, the gel can have acoustic properties suitable to ultrasound. For example, the gel helps add depth to a focal zone for superficial scans, eases difficult image and near field areas, provides soft cushion for sensitive areas, and/or is disposable between patients to maintain hygienic conditions. In some non-limiting embodiments, the one or more layers of gel can be wholly contained within a pad of the membrane 120. The gel can help acoustically couple ultrasound probe 116 to the skin of a patient. Liquid gel, for example, can be applied to probe 116 to provide this coupling. Alternatively, a gel pad can be used to provide acoustic coupling between probe 116 and the skin of a patient with reduced risk of contaminating a sterile site.

Membrane 120 can include one or more markings 121. In an example, one or more markings 121 can form a printed pattern on the membrane. Additionally or alternatively, one or more markings 121 can be embedded in membrane 120. In certain non-limiting embodiments, the one or more markings 121 can include a wire, bubble, or any other object that can be detected by ultrasound probe 116. One or more markings 121 can indicate an initial calibration, fiducial, or starting point for the transducer 122. Additionally or alternatively, the user can manually indicate using a user interface on display 114 or control panel 115 a starting position and/or orientation of the probe. An orientation of the probe can include any suitable angle, such as one or more of pitch, yaw, and roll angles. A user using the probe can place the probe at the calibration or starting point in a default orientation (e.g., at predetermined pitch, yaw, and roll angles) to begin imaging one or more body parts of a patient. Beyond the calibration or starting point, one or more markings 121 can also help track the position of the probe for the duration of the ultrasound imaging. In some non-limiting embodiments, one or more markings 121 can help track the position of the probe throughout the ultrasound imaging, while in other non-limiting embodiments, one or more markings 121 can help to track the position of the probe during at least a portion of the ultrasound imaging.

FIG. 2A is a diagram illustrating exemplary components of a system according to some examples of the disclosed subject matter. In particular, FIG. 2A illustrates an ultrasound system including an apparatus 110 with display 114 and probe 116. Probe 116 can be used to detect one or more markings 121 of a membrane 120 that can be located on a skin of a patient. In certain non-limiting embodiments, the one or more markings 121 are located on an outside surface of the membrane 120, for example, in printed form. Additionally or alternatively, the one or more markings 121 can be contained or embedded within the membrane 120. The one or more markings 121 can be a wire, bubble, or any other object detected by probe 116. Based on the one or more markings 121 of membrane 120, the ultrasound system can determine a position of probe 116.

In some non-limiting embodiments, an indication of the position of probe 116 can be rendered on display 114 of apparatus 110. The indication can be based on one or more predetermined selections made by the user. The selections available to the user can be programmed into the ultrasound imaging system. For example, the one or more selections can relate to the one or more body parts the user intends to image, the size or shape of the membrane, or any physical characteristics or attributes of the patient, including height and weight of the patient. In certain non-limiting embodiments, the one or more selections can be chosen by the user via a user interface shown on the display 114 and/or using controller 115. The one or more selections can be provided to and chosen by the user before imaging the patient. For example, a user can turn on the ultrasound imaging system and choose a selection indicating that the user intends to image the liver of a patient. Based on this selection, the indication illustrated on the display can instruct a user on how to position and orient the probe to effectively image the liver of a patient. For instance, the indication can include a map, with a trace indicated by a numbered sequence of indicated locations, as described above. Additionally or alternatively, based on the user's selection, certain parameters of the ultrasound imaging system can be automatically or manually adjusted. For example, if the selection indicates that the user intends to image the liver, the control and/or gain settings can be adjusted by the system to improve the imaging of the liver. In one example, the imaging settings are based on the type of membrane 120 and/or markings 121. For example, if the membrane 120 includes markings 121 that are detectable by ultrasound, e.g., bubbles or metal, the ultrasound system can configure the imaging parameters so that the markings 121 are properly imaged, possibly balancing the imaging quality of the ultrasound image of the patient with the detection of the markings 121. If the membrane 120 includes markings 121 that are not detectable by ultrasound, such as a printed pattern that is instead detectable by a camera, the ultrasound system can configure the imaging parameters so that ultrasound image is optimized (e.g., an anatomical region of interest is suitably imaged), without regards to the markings 121.

Figure 2B:
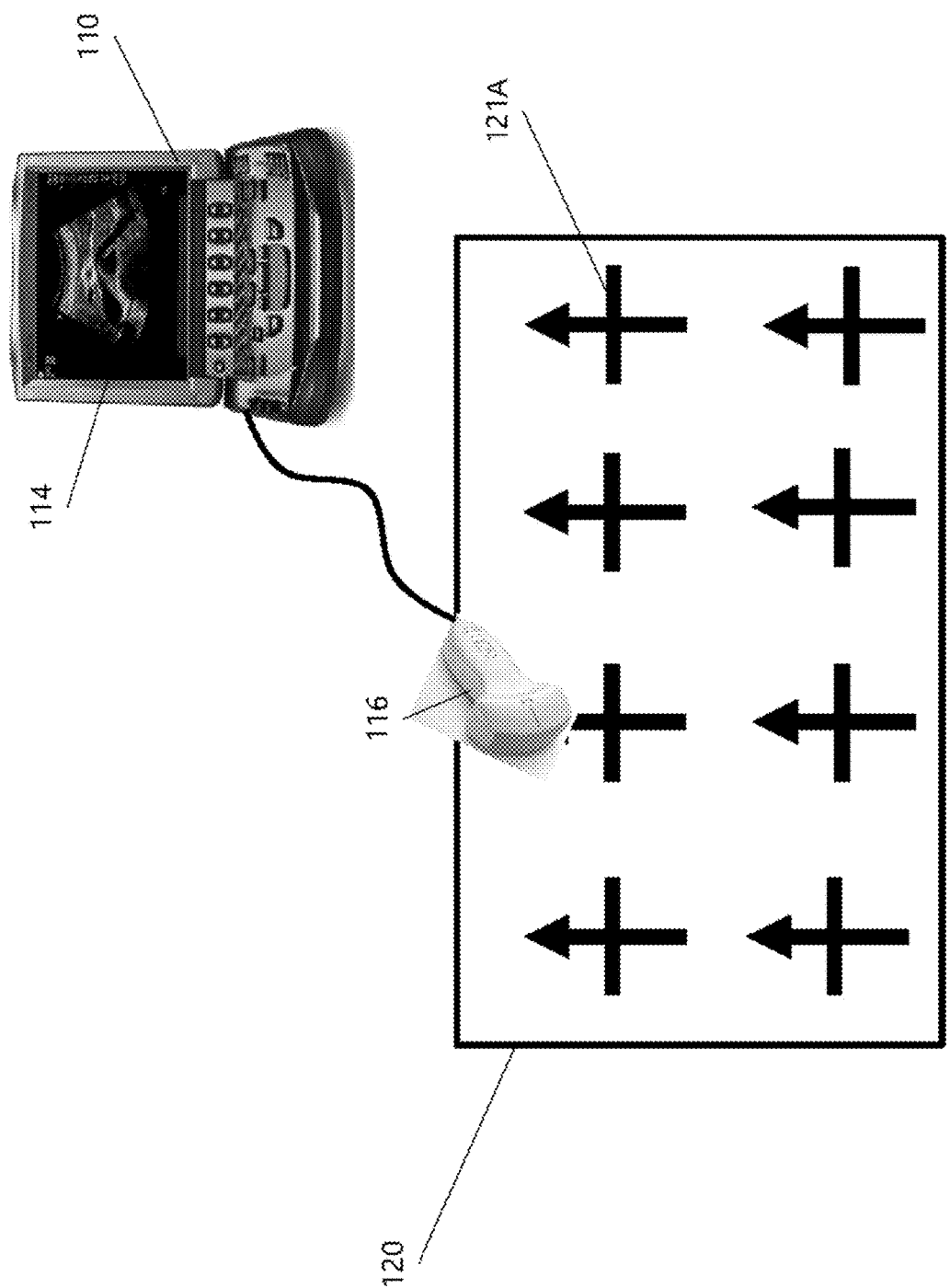
Figure 2C:
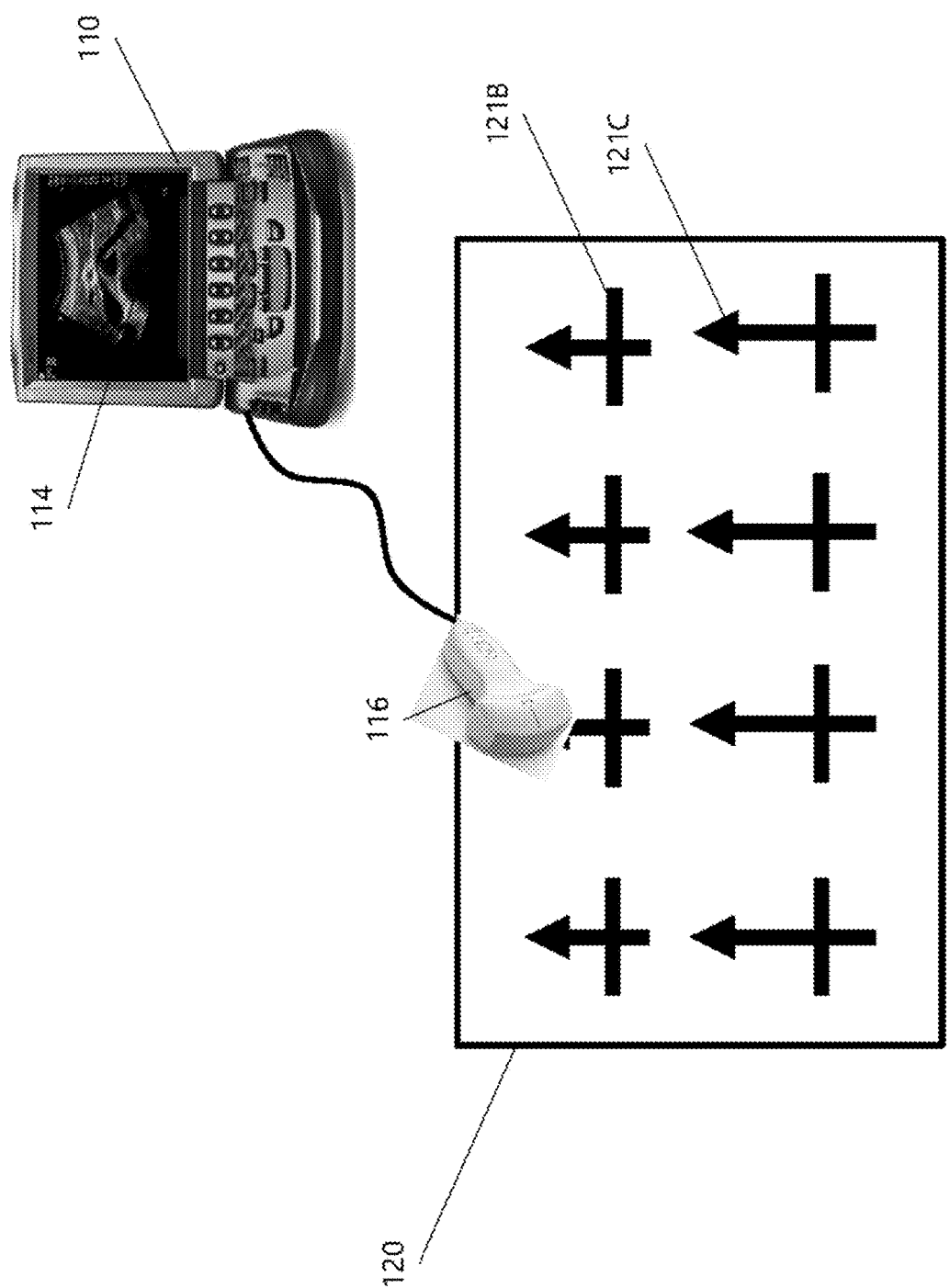
Figure 2D:
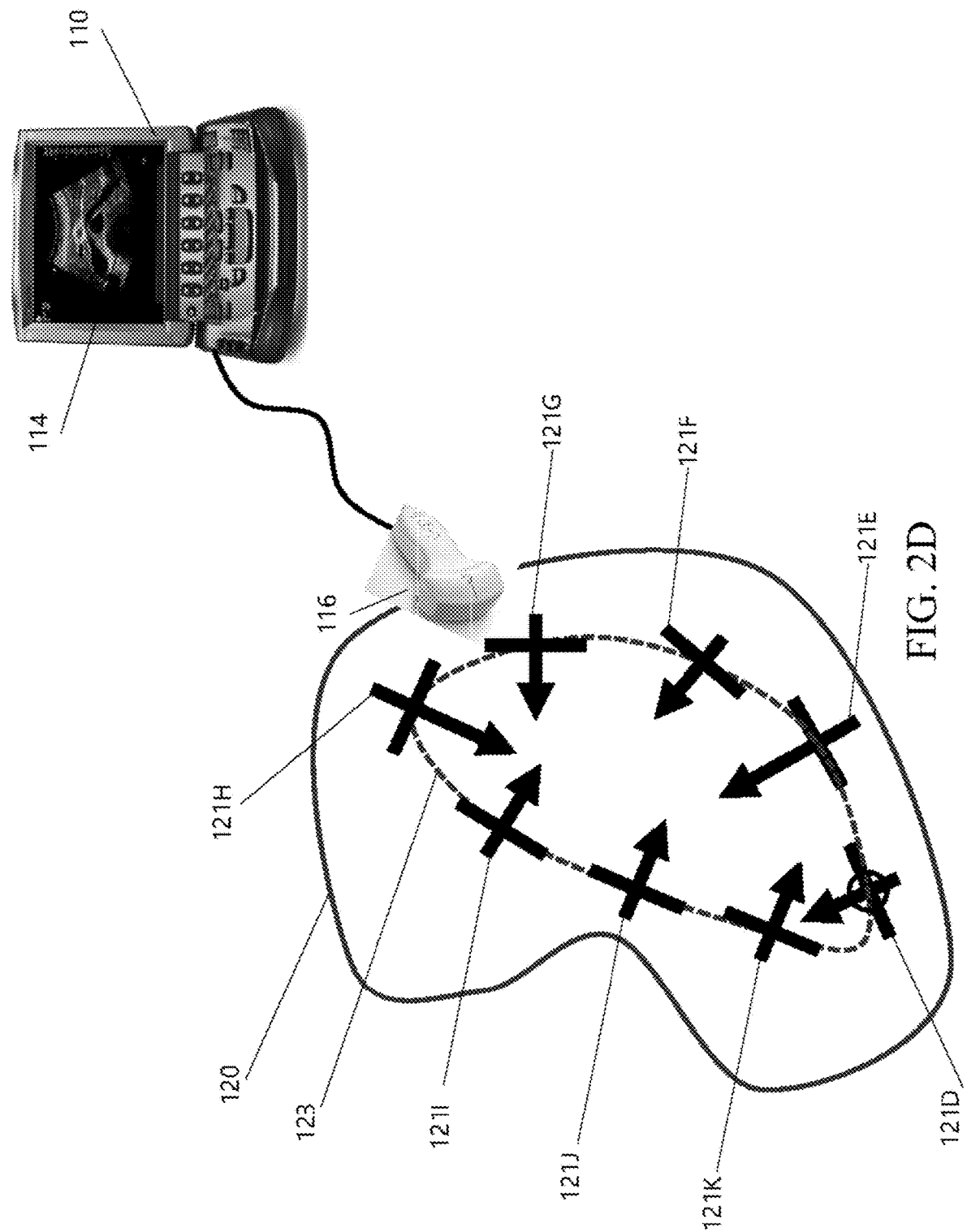

In certain non-limiting embodiments, one or more markings 121 can form an instructional map for the user to follow during the procedure. One or more markings 121, therefore, can be placed on the membrane based on the one or more body parts the user is attempting to image. For example, when one or more markings 121 include a printed pattern, the printed pattern can include a map of the probe positions that the user can follow to properly image a patient's body part. The printed pattern, for example, can include a calibration or starting point, and then sequentially numbered or alphabetized positions on the membrane for the user to follow. The positions can be indicated as part of a trace of the printed pattern, such as by circles or crosses (e.g., a "plus" sign, such as "+" as shown in FIG. 2A) on a continuous or discontinuous curve representing the trajectory and orientation the probe should follow during an examination. As shown in FIGS. 2B and 2C, for purpose of illustration and not limitation, markings 121A, 121B, 121C are examples of the one or more markings 121. The crosses can include one or more indicators, such as an arrow on one end of the cross that indicates an orientation to hold the probe as the probe is moved along the trace. For instance, by aligning a face of the probe with the arrow of the cross, a desired roll angle of the probe can be achieved. Additionally or alternatively, the cross of the marking 121B, 121C can be provided with variable-length segments (for example, as shown in FIG. 2C and FIG. 2D). A length of one or more segments of the cross can indicate an amount to tilt the probe to achieve a desired pitch angle, with a larger segment (for example, marking 121C which includes a larger segment as compared to marking 121B) indicating a larger desired pitch angle. Additionally or alternatively, a width of one of the segments can indicate an amount to tilt the probe to achieve a desired pitch angle, with a wider segment indicating to tilt the probe more than a narrower segment.

FIG. 2D illustrates an example of the ultrasound system of FIGS. 2A-2C, where the membrane 120 is in the shape of a body part, such as a kidney. The markings 121D-121K of the membrane 120 are examples of markings 121, and are placed on a trace 123 (represented as a dashed line in FIG. 2D) of the membrane 120. For instance, the trace 123 can be printed on the membrane 120, and together with the markings 121D-121K, can instruct the user how to orient and move the probe 116 to image the body part represented by the membrane 120. Marking 121D is illustrated with a circle at its center, to denote that marking 121D serves as an initial starting point for the probe 116 to perform the examination. During the examination, the probe 116 can be moved along trace 123 from one marking to the next marking, sequentially. For example, from marking 121D to marking 121E, then from marking 121E to marking 121F, then from marking 121F to marking 121G, etc., until the final marking in the sequence is reached, e.g., marking 121K. Each of the markings 121D-121K indicate a position as well as a pose to hold the probe 116, based on their arrows and line segment lengths. For instance, marking 121E indicates to tilt the probe 116 inward (towards the center of the membrane 120) more than marking 121F, which indicates to hold the probe 116 vertically, with no tilt, since the line segments of the marking 121F are all of equal length.

In one example, one or more markings 121 are located on an outside surface of the membrane 120. For example, one or more markings 121 in the form of a pattern can be printed in ink on an outside surface of the membrane 120. In certain other non-limiting embodiments, one or more markings 121 can be contained within the membrane 120. For example, when the membrane 120 takes the form of a gel pad, one or more markings 121 can be embedded within the one or more layers of gel, or on an inside surface of a layer of membrane 120. While in some non-limiting embodiments one or more markings 121 can take the form of a printed ink pattern, in other non-limiting embodiments one or more markings 121 can be any optical or ultrasound markings. Additionally or alternatively, the one or more markings 121 can be made of magnetic material or produce radio frequency waves. Alternatively or additionally, one or more markings 121 can be made of material or include material detectable by the ultrasound imaging. The material, for example, can be detected by probe 116 without blocking the ultrasound beam or degrading the image of the anatomical structure.

In certain non-limiting embodiments, the ultrasound imaging system can detect one or more markings 121 of membrane 120. Membrane 120 can be located on a skin of a patient. One or more markings 121 can then be detected by image sensor 117 or by the transducer array of the transducer 122 of probe 116. Those markings 121 detected by image sensor 117 (e.g., by a camera) can include ink or metal. Those markings 121 detected by the transducer array can include plastic, metal, water, thick film ink, or any other material with a different acoustic impedance to the anatomical structure. Based on the detected one or more markings 121, the ultrasound imaging system can estimate, determine, or derive the position, location, and/or orientation of the probe.

In non-limiting embodiments, probe 116 can include an inertial sensor 118. The position, location, and/or orientation of the probe can, in part, be determined based on the use of the data produced by the inertial sensor. The data produced by the inertial sensor, for example, can include movement data related to the motion, speed, acceleration, or direction of probe 116. The data produced by the inertial sensor can be adjusted based on the one or more detected markings. For example, the data produced by the inertial sensor can be adjusted based on the calibration or starting point detected by the probe. This adjustment of the data produced by the inertial sensor can help to correct for any drift of the inertial sensor that occurs during use. For example, a first position can be determined from the inertial sensor and a second position can be determined based on the starting point and markings. An error can then be determined based on comparing the first and second positions, at which point the first position can be adjusted based on the comparison and the second position. In certain non-limiting embodiments, the error can be determined based on a weighted expected accuracy of each sensor or transducer 122. For example, given that an inertial sensor 118 can drift in the plane parallel to the earth's surface, data produced by image sensor 117 can be weighted heavier than data produced by inertial sensor 118. Accordingly, certain non-limiting embodiments can estimate the position of the transducer 122 based on the one or more markings, detected by image sensor 117 or by the transducer array of the transducer 122 of probe 116, the data produced by the inertial sensor 118, or combinations thereof. In one example, each marking of the markings 121 is unique in a way that allows the system to determine the location and orientation of the probe 116 (relative to the membrane 121) solely by detecting that marking. For example, markings 121 can include a unique size, shape, color, or other suitable physical feature, such as a numerical indicator, to distinguish individual markings. The rotational orientations of the physical features of the markings 121 can be used by the system to determine an orientation of the probe 116, and the location of the probe 116 can be based on which of the unique markings is detected. Additionally or alternatively, the markings 121 can include a unique physical or electronic code that can be detected by the probe 116, for example, Quick Response (QR) code, RFID tag, or other unique feature.

As described above, one or more of the probe 116, image sensor 117, and/or inertial sensor 118 can be used to determine the position and/or orientation of the probe 116. In certain non-limiting embodiments, the position of the probe 116 can be estimated using simultaneous localization and mapping (SLAM). SLAM can be a statistical method used to combine information or data produced from one or more sensors. For example, SLAM can track set points through successive camera frames or inertial sensor measurements and triangulate the two-dimensional or three-dimensional positions of the probe. SLAM can account, correct, and/or compensate for a certain amount of error in the data produced by each sensor. For example, SLAM can be used to compute the probability of the object being in a particular place based on the probability of a previous location and probabilities associated with one or more sensors, such as image sensor 117 and inertial sensor 118. Accordingly, SLAM can improve the accuracy of the position estimate of the probe by accounting for the probability of error in the data produced from image sensor 117 and/or inertial sensor 118. In other non-limiting embodiments other statistical techniques, such as Kalman filters, Monte Carlo methods, Particle filters, Sequential Monte Carlo, and/or transferable belief model (TBM), can be used to estimate the position of the probe. Additionally or alternatively, the statistical technique used to combine information from one or more sensors can be Bayesian, Evidential, and/or fuzzy.

In one example, visualized landmarks within the body are combined with sensor data (e.g., data from image sensor 117 and/or inertial sensor 118) as input to the SLAM algorithm. For example, if a user is trying to navigate back to a part of the patient's body that was previously imaged (e.g., the user may want to return to a place where a good vein access site was found for peripheral intravenous catheterization, or want to navigate back to a place where a good view of an organ was found), the SLAM algorithm can combine information of recognized, unique anatomical landmarks with the input from image sensor 117 and/or inertial sensor 118 and determine a better position estimate. Such anatomical landmarks could be a particular bony structure such as a rib, a unique edge of an organ such as a tip of the liver, and the like.

In certain non-limiting embodiments, the ultrasound imaging system can render on display 114 an indication of the estimated position of the transducer 122 (and/or the position of probe 116). As described above, display 114 can be included within apparatus 110, as shown in FIG. 1, can include a separately-located display communicatively coupled to apparatus 110 and/or probe 116, or combinations thereof. The indication can be a marking on the display 114 showing the current position or location of the probe 116 relative to one or more body parts of the patient. For example, the display can include an illustration of the patient's body. The current position of the probe 116 can be shown as a marking on the illustration of the patient's body. In other examples, the display can include a map of the membrane. The ultrasound system can denote the current position of the probe 116 as an indication on the map of the membrane. The indication, for example, can be a dot, diamond, cross, probe icon, or any other marking indicating the current position of the probe.

In addition to the current position of the probe, the indication can include a marking showing the previous recorded positions of the probe. For example, the calibration or starting point of the probe can be marked with a first designator, such as a cross. The movement of the probe relative to the patient's body or membrane can be marked using a dashed line. The current position of the probe can be marked using a second designator, such as a blinking dot.

In some non-limiting embodiments, the indication can include guidance information. The guidance information can help the user of the ultrasound imaging system to navigate or move the probe on the skin of the patient or on the membrane. The guidance information can include textual instructions for the user to move the probe in an x, y, or z-plane or direction. For example, the guidance information can instruct the user to move the probe in a north-western direction. The textual instructions can also include a distance measurement associated with the recommended movement. For example, the display can instruct the user to move the probe 0.5 inches to the right in the x-plane or user to move the probe 0.5 inches in the east direction.

In some non-limiting embodiments, the indication can include an illustration of the membrane or the patient. The indication can then provide mapped instructions using arrows, lines, highlights, or any other illustrations, instructing the user how to navigate or move the probe 116. The instructions, for example, can be in the form of a dashed line on the display which the user can attempt to trace with the probe. As the probe is moved, the current location of the probe can be shown as a blinking dot moving along the dashed line.

In certain non-limiting embodiments, artificial intelligence or machine learning models can be incorporated to help improve the indication or guidance being provided to the user. For example, a machine learning model can assist the ultrasound imaging system to determine the position of the probe 116 based on the one or more detected markings. The inputs to the machine learning model can include the positions of one or more markings, estimated positions of the probe, or combinations thereof. The output of the machine learning model can include an indication or guidance provided to the user. For example, if a user begins imaging the heart of a patient, and ultrasound guidance system 100 receives information that the probe has been moved away from the heart, the system can provide the user with an indication or guidance to return to a proper location for imaging the heart. Additionally or alternatively, the artificial intelligence or machine learning models can help to automatically adjust an imaging parameter, such as a control or gain used to generate the ultrasound image as the user is navigating the probe across the patient's body. For example, if a user begins imaging a heart of a patient, and the ultrasound imaging system receives information that the probe has been moved away from the heart, the system can determine that the probe is now in a position to image the aortic arch of the patient, and the imaging parameters can be modified to better image the aortic arch. Machine learning can be used to determine which organs are typically imaged together and/or in particular sequences, and can better predict the next organ intended for imaging based on the location of the probe.

Figure 3:
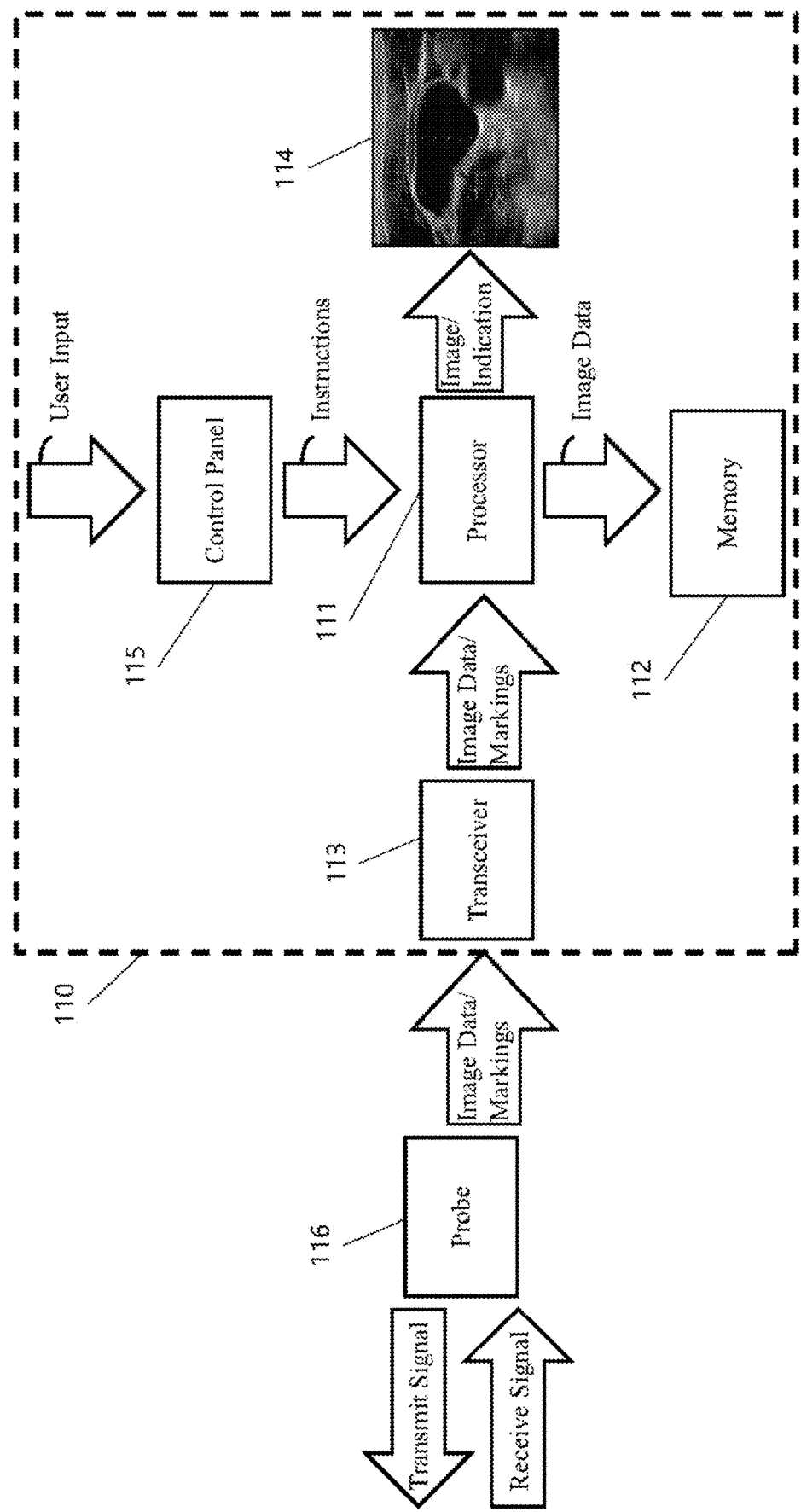
FIG. 3 is a diagram illustrating exemplary components of a system according to some examples of the disclosed subject matter.

FIG. 3 is a diagram illustrating exemplary components of a system according to some examples of the disclosed subject matter. Probe 116 includes a transducer 122 configured to transmit or receive ultrasound waves. In certain non-limiting embodiments, probe 116 is used to detect one or more markings of a membrane located on a skin of a patient. Image data and/or any information related to the detected one or more markings is then transmitted to transceiver 113 of apparatus 110. Apparatus 110 can then process the image data and the markings using processor 111 to output the image and/or indication on display 114 of the ultrasound system. In certain non-limiting embodiments, the indication can be based on one or more predetermined selections made by the user using control panel 115. Additionally or alternatively, display 114 can be a touch screen and the user can input selections directly on display 114. The user selections can then be transmitted as instructions to processor 111, which can in certain non-limiting embodiments be used to determine the image or indication provided on display 114. In some non-limiting embodiments, processor 111 can store image data in memory 112.

Figure 4:
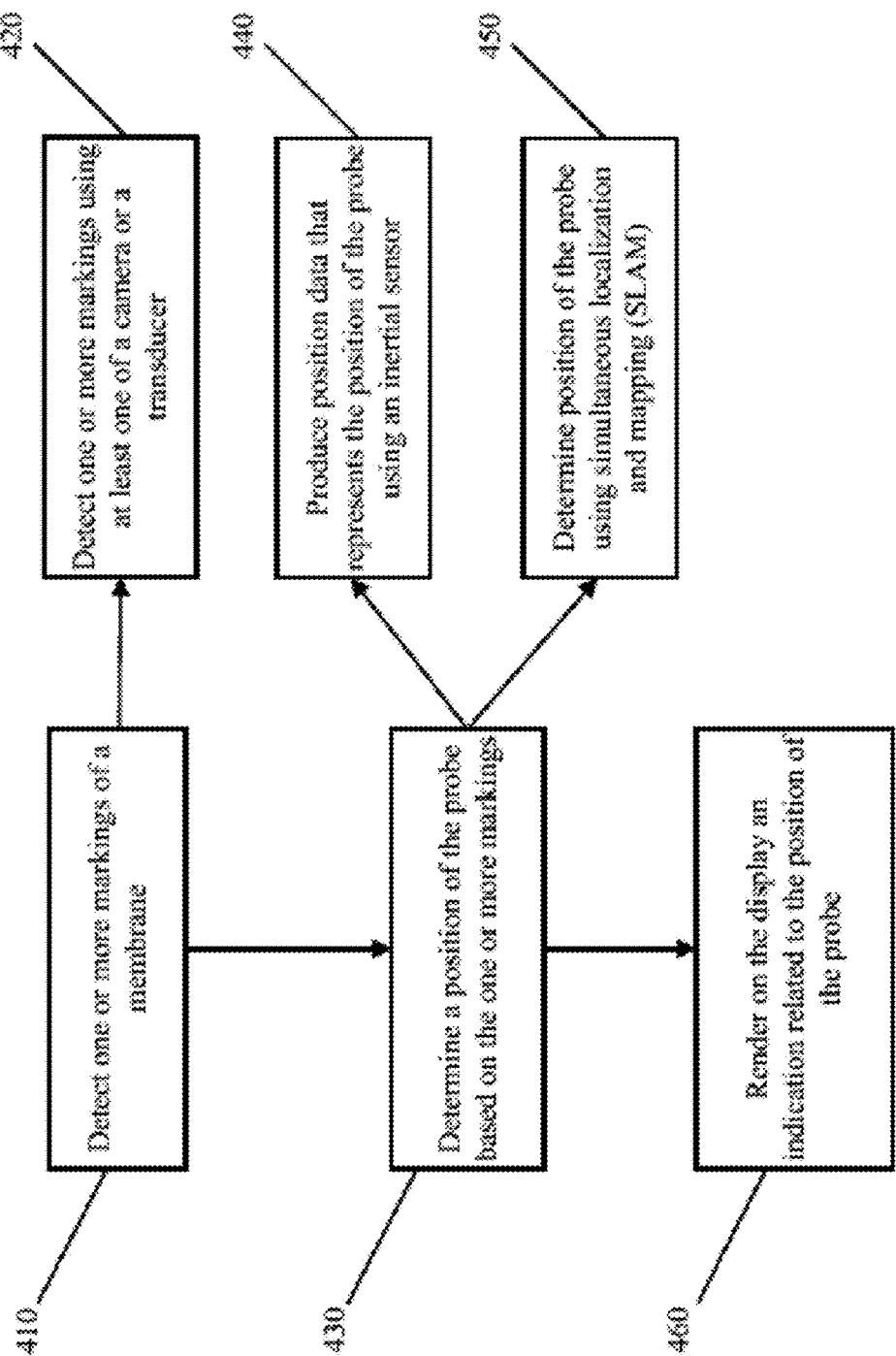
FIG. 4 is a flow diagram of a method or process according to some examples of the disclosed subject matter.

FIG. 4 includes a flow diagram of a procedure according to some examples of the disclosed subject matter. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure can be performed by a suitably configured computing device, such as one or more of the ultrasound imaging systems shown in FIGS. 1-3 including apparatus 110, probe 116, or combinations thereof.

At block 410, one or more markings of a membrane located on a skin of a patient are detected. The one or more markings can include a printed pattern on the membrane. In certain non-limiting embodiments, an outside surface of the membrane includes the one or more markings and/or the membrane contains the one or more markings. The membrane can be a thin adhesive plastic and/or a pad comprising a layer of gel. The detection is performed using at least one of an image sensor 117 or a transducer array of the transducer 122 of probe 116, as shown in block 420. The position of probe 116 is determined based on the one or more markings, as shown in block 430. In one example, position data that represents the position of the probe is produced using an inertial sensor, as shown in block 440. Additionally or alternatively, the position is estimated using simultaneous localization and mapping (SLAM), as shown in block 450. At block 460, the display renders an indication related to the position of the probe, e.g., an indication of the position of the probe, such as an indication of a position of the probe on a plane or curved surface, an indication of the orientation of the probe, such as a rotation of the probe or an angle of the probe relative the membrane, an indication relative to a body part of the patient, an indication on a map or trace that is part of the membrane, and the like. Display 114, for example, can be instructed by one or more processors 111 to render the indication.

In one example, the ultrasound system combines data from image sensor 117, from inertial sensor 118, and ultrasound data from probe 116 to estimate the pose of probe 116, such as a six-degree-of-freedom orientation relative to the membrane 120, and therefore also relative to the skin surface, including translation and rotation about x, y, and z axes. In this way, the ultrasound system can give guidance to the user not only to move the probe N, S, E, or W, but also to rotate the probe counterclockwise or clockwise and to "fan" the probe tail up or tail down.

The above embodiments described herein provide significant technical improvements and advantages compared to ultrasound systems that do not determine probe position based on a membrane on a patient's skin, and provide user instructions for guiding the probe based on the probe position. In contrast, the systems and procedures described herein enable the improved operation of the ultrasound imaging system by providing user guidance based on a determined probe position and/or pose. For example, the user can view a displayed indication, and can adjust the positioning (including pose) of the probe based on the indication. The adjusted position of the probe can help to improve the quality of the captured image. In addition, the adjusted position of the probe can help to limit the need to repeat the imaging. This reduced need for further imaging can help to prevent or eliminate any wasted resources that would otherwise be dedicated by the system for repeated imaging. The disclosed system, apparatus, or method can therefore improve both the functioning of the ultrasound imaging and reduce the amount of resources, such as processor, memory, power, or network resources, used by the ultrasound imaging system. Moreover, by reducing the need for further imaging, the disclosed systems, apparatuses, and methods can reduce the amount of time a patient is examined, and thus the amount of stress endured by the patient. For instance, in some ultrasound examinations, a patient is asked to hold their breath, to reduce image degradation caused by moving body parts while breathing. For patients with respiratory illnesses, the act of holding one's breath can be painful or difficult. Hence, the disclosed systems, apparatuses, and methods can reduce risk to the patient, compared to conventional systems, apparatuses, and methods that do not determine probe position based on a membrane on a patient's skin, and provide user instructions for guiding the probe based on the probe position.

The features, structures, or characteristics of certain embodiments described throughout this specification can be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment can be included in at least one embodiment of the disclosed subject matter. Thus, appearance of the phrases "in certain embodiments," "in some embodiments," "in other embodiments," or other similar language, throughout this specification does not necessarily refer to the same group of embodiments, and the described features, structures, or characteristics can be combined in any suitable manner in one or more embodiments.

One having ordinary skill in the art will readily understand that the disclosed subject matter as discussed above can be practiced with procedures in a different order, and/or with hardware elements in configurations which are different from those disclosed. Therefore, although the disclosed subject matter has been described based upon these embodiments, it would be apparent to those of skill in the art that certain modifications, variations, and alternative constructions would be apparent, while remaining within the spirit and scope of the disclosed subject matter.

The invention claimed is:

1. An ultrasound system, comprising:
a probe comprising a transducer configured to transmit or receive ultrasound waves;
a display communicatively coupled to the probe; and
one or more processors configured to cause the ultrasound system to:
detect, using the probe:
one or more markings of a membrane located on a skin of a patient, the one or more markings of the membrane having a length or a width indicating an amount to tilt the probe as the probe is moved; and
one or more landmarks within a body of the patient;
determine a position of the probe based on:
at least one marking of the one or more markings; and
at least one landmark of the one or more landmarks within the body of the patient;
determine an adjustment for one or more imaging parameters based on the position of the probe relative to the at least one marking and the at least one landmark;
adjust, using the determined adjustment, the one or more imaging parameters; and
render on the display an indication of the position of the probe.

2. The ultrasound system of claim 1, wherein an outside surface of the membrane comprises the one or more markings.

3. The ultrasound system of claim 1, wherein the membrane contains the one or more markings.

4. The ultrasound system of claim 1, wherein the membrane includes a pad comprising a layer of gel.

5. The ultrasound system of claim 1, further comprising:
an inertial sensor communicatively coupled to the probe, wherein the inertial sensor produces position data that represents the position of the probe, and wherein the one or more processors are configured to:
generate based on the position data, a confirmation that an error of the position is less than a threshold.

6. The ultrasound system of claim 1, wherein the indication includes instructions to navigate the transducer on the skin of the patient.

7. The ultrasound system of claim 1, wherein the one or more markings comprise one of a Quick Response (QR) code and a radiofrequency identification (RFID) tag.

8. The ultrasound system of claim 1, wherein the membrane is in the shape of a body part.

9. The ultrasound system of claim 1, wherein the one or more markings of the membrane indicate an orientation to hold the probe as the probe is moved.

10. The ultrasound system of claim 1, wherein the one or more markings further comprise an arrow or a cross.

11. The ultrasound system of claim 1, wherein the length of the one or more markings of the membrane indicates the amount to tilt the probe to achieve a target pitch angle.

12. The ultrasound system of claim 1, wherein the width of the one or more markings of the membrane indicates the amount to tilt the probe to achieve a target pitch angle, wherein a greater width indicates to tilt the probe more than a narrower width.

13. The ultrasound system of claim 1, further comprising:
a camera communicatively coupled to the probe, wherein the one or more markings of the membrane are detected using at least one of the camera or the transducer.

14. The ultrasound system of claim 13, wherein the probe comprises the camera and the transducer in a unitary housing.

15. The ultrasound system of claim 14, wherein the probe comprises a handle containing the camera.

16. The ultrasound system of claim 13, wherein the one or more markings include a printed pattern on the membrane.

17. The ultrasound system of claim 16, wherein the printed pattern on the membrane includes a starting point.

18. The ultrasound system of claim 16, wherein the printed pattern on the membrane includes a trace between markings of the one or more markings.

19. The ultrasound system of claim 1, wherein the adjustment is determined, at least in part, by a machine learning model and at least one input to the machine learning model is the determined position.

20. The ultrasound system of claim 19, wherein the machine learning model is further configured to determine at least one of:
the adjustment, wherein the adjustment is based on a target that the probe is approaching;
whether the probe has moved away from the target; or guidance to return to the target and provide the guidance to a user.

21. The ultrasound system of claim 1, wherein the one or more markings of the membrane are detectable by an ultrasound wave.

22. The ultrasound system of claim 21, wherein the one or more markings of the membrane comprises metal or bubbles.

23. An ultrasound system, comprising:
a probe comprising a transducer configured to transmit or receive ultrasound waves;
a camera communicatively coupled to the probe;
a display communicatively coupled to the probe; and
one or more processors configured to cause the ultrasound system to:
  detect, using the probe:
    one or more markings of a membrane located on a skin of a patient, the one or more markings of the membrane having a length or a width indicating an amount to tilt the probe as the probe is moved; and
    one or more landmarks within a body of the patient;
  determine a position of the probe based on:
    at least one marking of the one or more markings; and
    at least one landmark of the one or more landmarks within the body of the patient;
  determine an adjustment for one or more imaging parameters based on the position of the probe relative to the at least one marking and the at least one landmark;
  adjust, using the determined adjustment, the one or more imaging parameters; and
  render on the display an indication of the position of the transducer.

24. The ultrasound system of claim 23, wherein the one or more processors are further configured to cause the ultrasound system to:
determine the position of the probe based at least in part on simultaneous localization and mapping.

25. The ultrasound system of claim 23, wherein the one or more markings include a printed pattern on the membrane.

26. The ultrasound system of claim 23, wherein an outside surface of the membrane comprises the one or more markings.

27. The ultrasound system of claim 23, wherein the membrane contains the one or more markings.

28. The ultrasound system of claim 23, wherein the membrane is at least one of an adhesive plastic or a pad comprising a layer of gel.

29. The ultrasound system of claim 23, wherein the indication comprises guidance information, wherein the guidance information helps navigate the probe on the skin of the patient.

30. The ultrasound system of claim 23, wherein the one or more markings comprise one of a Quick Response (QR) code and a radiofrequency identification (RFID) tag.

31. The ultrasound system of claim 23, further comprising an inertial sensor communicatively coupled to the probe.

32. The ultrasound system of claim 31, wherein the one or more processors are further configured to cause the ultrasound system to determine the position of the transducer based at least in part on data produced by the inertial sensor.

33. The ultrasound system of claim 31, wherein the probe comprises the camera, the transducer, and the inertial sensor in a unitary housing.

34. The ultrasound system of claim 23, wherein the adjustment is determined, at least in part, by one of a machine learning model or an artificial intelligence model, and at least one input to the machine learning model or artificial intelligence model is the determined position.

35. The ultrasound system of claim 34, wherein the machine learning model or the artificial intelligence model is further configured to determine at least one of:
the adjustment, wherein the adjustment is based on a target that the probe is approaching;
whether the probe has moved away from the target; or guidance to return to the target, and provide the guidance to a user.

36. A method for ultrasound imaging comprising:
detecting, using an ultrasound probe:
  one or more markings of a membrane located on a skin of a patient; and
  one or more landmarks within a body of the patient;
determining a position of the ultrasound probe based on:
  at least one marking of the one or more markings, the one or more markings of the membrane having a length or a width indicating an amount to tilt the probe as the probe is moved; and
  at least one landmark of the one or more landmarks within the body of the patient;
determining an adjustment for one or more imaging parameters based on the position of the ultrasound probe relative to the at least one marking and the at least one landmark;
adjusting, using the determined adjustment, the one or more imaging parameters; and
rendering on a display an indication of the position of the ultrasound probe.

37. The method of claim 36, wherein the one or more markings are detected using the ultrasound probe comprising a camera or a transducer.

38. The method of claim 36, wherein the one or more markings comprise one of a Quick Response (QR) code and a radiofrequency identification (RFID) tag.

39. The method of claim 36, further comprising:
   determining a first position of the ultrasound probe based on an inertial sensor;
   determining a second position of the probe based on a starting point and the one or more markings of the membrane;
   comparing the first position with the second position to determine an error; and
   adjusting the first position based on the comparison.

40. The method of claim 36, wherein the adjustment is determined, at least in part, by one of a machine learning model or an artificial intelligence model, and at least one input to the machine learning model or artificial intelligence model is the determined position.

41. The method of claim 40, wherein the machine learning model or the artificial intelligence model is further configured to determine at least one of:
   the adjustment, wherein the adjustment is based on a target which the probe is approaching;
   whether the probe has moved away from the target; or
   guidance to return to the target and provide the guidance to a user.

* * * * *